(12) United States Patent
Beeram et al.

(10) Patent No.: US 12,212,490 B2
(45) Date of Patent: Jan. 28, 2025

(54) RESOURCE RESERVATION PROTOCOL WITH TRAFFIC ENGINEERING PATH COMPUTATION ACROSS INTERMEDIATE SYSTEM—INTERMEDIATE SYSTEM FLOOD REFLECTOR CLUSTERS

(71) Applicant: Juniper Networks, Inc., Sunnyvale, CA (US)

(72) Inventors: Vishnu Pavan Beeram, Hyderabad (IN); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/477,340

(22) Filed: Sep. 28, 2023

(65) Prior Publication Data
US 2024/0305563 A1 Sep. 12, 2024

(30) Foreign Application Priority Data
Mar. 10, 2023 (IN) .............................. 202341016000

(51) Int. Cl.
*H04L 45/50* (2022.01)
*H04L 45/00* (2022.01)
*H04L 45/02* (2022.01)

(52) U.S. Cl.
CPC .............. *H04L 45/50* (2013.01); *H04L 45/02* (2013.01); *H04L 45/32* (2013.01)

(58) Field of Classification Search
CPC .......... H04L 45/50; H04L 45/02; H04L 45/32

USPC ......................................................... 709/238
See application file for complete search history.

(56) References Cited

U.S. PATENT DOCUMENTS

| | | | |
|---|---|---|---|
| 2009/0228604 A1* | 9/2009 | Miyazaki | H04L 45/302 370/254 |
| 2012/0308225 A1* | 12/2012 | Long | H04L 45/04 398/13 |
| 2014/0092722 A1* | 4/2014 | Jain | H04L 45/50 370/217 |
| 2015/0163125 A1* | 6/2015 | Caviglia | H04L 45/42 370/254 |
| 2021/0320929 A1* | 10/2021 | Xie | H04L 69/22 |

FOREIGN PATENT DOCUMENTS

CN 116094987 A * 5/2023

* cited by examiner

*Primary Examiner* — Wing F Chan
*Assistant Examiner* — John Fan
(74) *Attorney, Agent, or Firm* — Harrity & Harrity, LLP

(57) ABSTRACT

In some implementations, a head Level 2 (L2) node of an intermediate system-intermediate system (IS-IS) flood reflection (FR) network may determine an end-to-end path from the head L2 node to a tail L2 node of the IS-IS FR network. The IS-IS FR network includes a plurality of L2 nodes and a plurality of FR clusters that each comprise a plurality of Level 1 (L1) nodes and a plurality of L1 and L2 (L1/L2) nodes connected by a plurality of L1 links. The head L2 node may send information associated with the end-to-end path to another node identified in the end-to-end path to cause a label switched path (LSP) to be established from the head L2 node to the tail L2 node, wherein the LSP traverses one or more L1 links within an FR cluster of the IS-IS FR network.

20 Claims, 9 Drawing Sheets

RESOURCE RESERVATION PROTOCOL WITH TRAFFIC ENGINEERING PATH COMPUTATION ACROSS INTERMEDIATE SYSTEM—INTERMEDIATE SYSTEM FLOOD REFLECTOR CLUSTERS

CROSS-REFERENCE TO RELATED APPLICATION

This Patent Application claims priority to India Provisional Application No. 202341016000, filed on Mar. 10, 2023, and entitled "RESOURCE RESERVATION PROTOCOL PATH COMPUTATION ACROSS INTERMEDIATE SYSTEM—INTERMEDIATE SYSTEM FLOOD REFLECTOR CLUSTERS." The disclosure of the prior Application is considered part of and is incorporated by reference into this Patent Application.

BACKGROUND

The resource reservation protocol (RSVP) is a transport layer protocol designed to reserve resources across a network using an integrated services model. The RSVP operates over Internet protocol (IP) version 4 (IPv4) or IP version 6 (IPv6) and provides receiver-initiated setup of resource reservations for multicast or unicast data flows. A label-switched path (LSP) is a path through a multiprotocol label switching (MPLS) network set up by a signaling protocol, such as the RSVP. An LSP typically includes an ingress node, one or more transit nodes, and an egress node.

SUMMARY

In some implementations, a method includes determining, by a head Level 2 (L2) node of an intermediate system-intermediate system (IS-IS) flood reflection (FR) network, an end-to-end path from the head L2 node to a tail L2 node of the IS-IS FR network, wherein the IS-IS FR network includes a plurality of L2 nodes and a plurality of FR clusters that each comprise a plurality of Level 1 (L1) nodes and a plurality of L1 and L2 (L1/L2) nodes connected by a plurality of L1 links; and sending, by the head L2 node, information associated with the end-to-end path to another node identified in the end-to-end path to cause a label switched path (LSP) to be established from the head L2 node to the tail L2 node, wherein the LSP traverses one or more L1 links within an FR cluster of the IS-IS FR network.

In some implementations, a non-transitory computer-readable medium storing a set of instructions includes one or more instructions that, when executed by one or more processors of a head L2 node of an IS-IS FR network, cause the head L2 node to: determine an end-to-end path from the head L2 node to a tail L2 node of the IS-IS FR network, wherein the IS-IS FR network includes a plurality of FR clusters that each comprise a plurality of L1 links; and send information associated with the end-to-end path to another node identified in the end-to-end path to cause an LSP to be established from the head L2 node to the tail L2 node, wherein the LSP traverses one or more L1 links of the plurality of L1 links the IS-IS FR network.

In some implementations, a head L2 node of an IS-IS FR network includes one or more memories; and one or more processors to: determine an end-to-end path from the head L2 node to a tail L2 node of the of the IS-IS FR network, wherein the IS-IS FR network includes a plurality of FR clusters; and send information associated with the end-to-end path to another node identified in the end-to-end path to cause an LSP to be established from the head L2 node to the tail L2 node, wherein the LSP traverses one or more FR clusters of the IS-IS FR network.

DETAILED DESCRIPTION

Figure 1A:
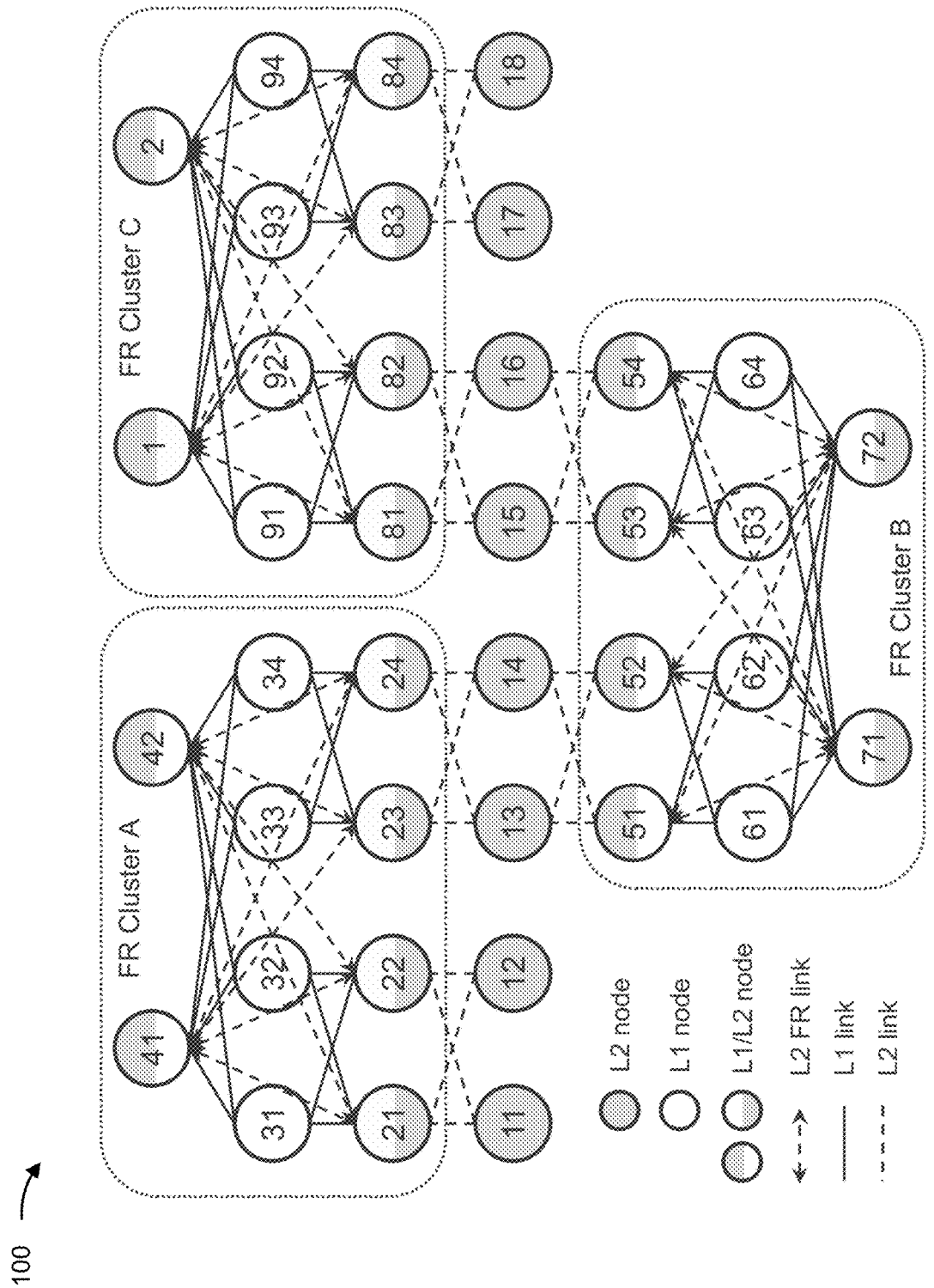
FIGS. 1A-1E are diagrams of an example implementation associated with RSVP with traffic engineering (RSVP-TE) path computation across FR clusters of an IS-IS FR network.

The following detailed description of example implementations refers to the accompanying drawings. The same reference numbers in different drawings may identify the same or similar elements.

Intermediate system-intermediate system (IS-IS) flood reflection (FR) enables creation of flood-reflection topologies where Level 1 (also referred to as L1) areas (also referred to as FR clusters) provide transit forwarding for Level 2 (also referred to as L2) destinations within an L2 topology. This is accomplished by providing L1 and L2 (L1/L2) nodes (also referred to as L2 flood-reflection adjacencies) within each L1 area. The L1/L2 nodes are used to flood L2 link-state packet data units (PDUs) that are used in a Level 2 shortest-path-first (SPF) computation.

RSVP with traffic engineering (RSVP-TE) is a network signaling protocol used to set up and manage LSPs with traffic engineering capabilities. RSVP-TE enables nodes within a network to send signaling messages to each other to reserve resources along the path of an LSP. However, in an IS-IS FR network, L2 nodes and L1 nodes are not able to directly communicate with each other, and therefore an optimal LSP (e.g., that satisfies one or more traffic engineering requirements) cannot be established across the IS-IS FR network.

Some implementations described herein include a head L2 node of an IS-IS FR network. The head L2 node determines an end-to-end path from the head L2 node to a tail L2 node of the IS-IS FR network. The head L2 node then sends information associated with the end-to-end path to another node (e.g., a next-hop node in the end-to-end path) to cause an LSP to be established, from the head L2 node to the tail L2 node, that traverses one or more FR clusters of the IS-IS FR network (e.g., traverses one or more L1 links within each FR cluster of the one or more FR clusters). For example, the head L2 node may communicate with a path computation node to receive an end-to-end path that identifies L1 and/or L1/L2 nodes of the one or more FR clusters, and therefore the head L2 node may send information associated with the end-to-end path to cause an LSP to be established that traverses the L1 and/L1/L2 nodes. As another example, the head L2 node may determine an end-to-end path that identifies FR clusters, or L1/L2 nodes of FR clusters, and the head L2 node may send information associated with the end-to-end path to cause an ingress L1/L2 node of an FR cluster (e.g., that is identified by the end-to-end path) to determine an L1 path (e.g., comprising one or more L1 links) through the FR cluster. The ingress L1/L2 node may modify the information associated with the end-to-end path to indicate the L1 path, which facilitates establishment of an LSP that traverses the L1 path of the FR cluster.

In this way, some implementations described herein enable an LSP to be established (e.g., dynamically established) in an IS-IS FR network that traverses one or more FR clusters of the IS-IS FR network (e.g., via one or more L1 links of the one or more FR clusters), which is not currently feasible for IS-IS FR networks. Accordingly, some implementations enable establishment of an optimal LSP (e.g., that satisfies one or more traffic engineering requirements) in an IS-IS FR network that would otherwise not be able to be established.

FIGS. 1A-1E are diagrams of an example implementation 100 associated with RSVP-TE path computation across FR clusters of an IS-IS FR network. As shown in FIGS. 1A-1E, example implementation 100 includes a plurality of nodes in an IS-IS FR network. These devices are described in more detail below in connection with FIGS. 2-4.

The plurality of nodes may include, for example, a plurality of L1 nodes (shown with no shading), a plurality of L2 nodes (shown with shading), and a plurality of L1/L2 nodes (shown with partial shading). In some implementations, as shown in FIG. 1A, the IS-IS FR network may include a plurality of FR clusters (shown as FR clusters A, B, and C), where each FR cluster includes a plurality of L1 nodes and a plurality of L1/L2 nodes connected by a plurality of L1 links (shown as solid lines). For example, the FR cluster A shown in FIG. 1A may include the L1 nodes 31, 32, 33, and 34, and the L1/L2 nodes 21, 22, 23, 24, 41, and 42 (e.g., where each L1/L2 node may be configured to be an ingress L1/L2 node, an egress L1/L2 node, and/or an FR L1/L2 node for the FR cluster A) that are variously connected by a plurality of L1 links. Further, the plurality of L1/L2 nodes within each FR cluster may be connected by a plurality of L2 FR links (shown as dashed lines with arrow heads). For example, the L1/L2 nodes 21, 22, 23, 24, 41, and 42 are variously connected by a plurality of L2 FR links.

Additionally, as further shown in FIG. 1A, the IS-IS FR network may include a plurality of L2 nodes that are connected to L1/L2 nodes of the plurality of FR clusters via a plurality of L2 links. For example, as shown in FIG. 1A, the IS-IS FR network may include the L2 nodes 11, 12, 13, 14, 15, 16, 17, and 18 that are each connected to L1/L2 nodes of one or more FR clusters by L2 links.

In some implementations described herein, a first L2 node of the IS-IS FR network, referred to herein as a head L2 node, may determine information to facilitate establishment of an LSP to a second L2 node of the IS-IS FR network, referred to as a tail L2 node. FIGS. 1B-1E show the L2 node 11 as the head L2 node and L2 node 18 as the tail L2 node, but other examples may be used.

Figure 1B:
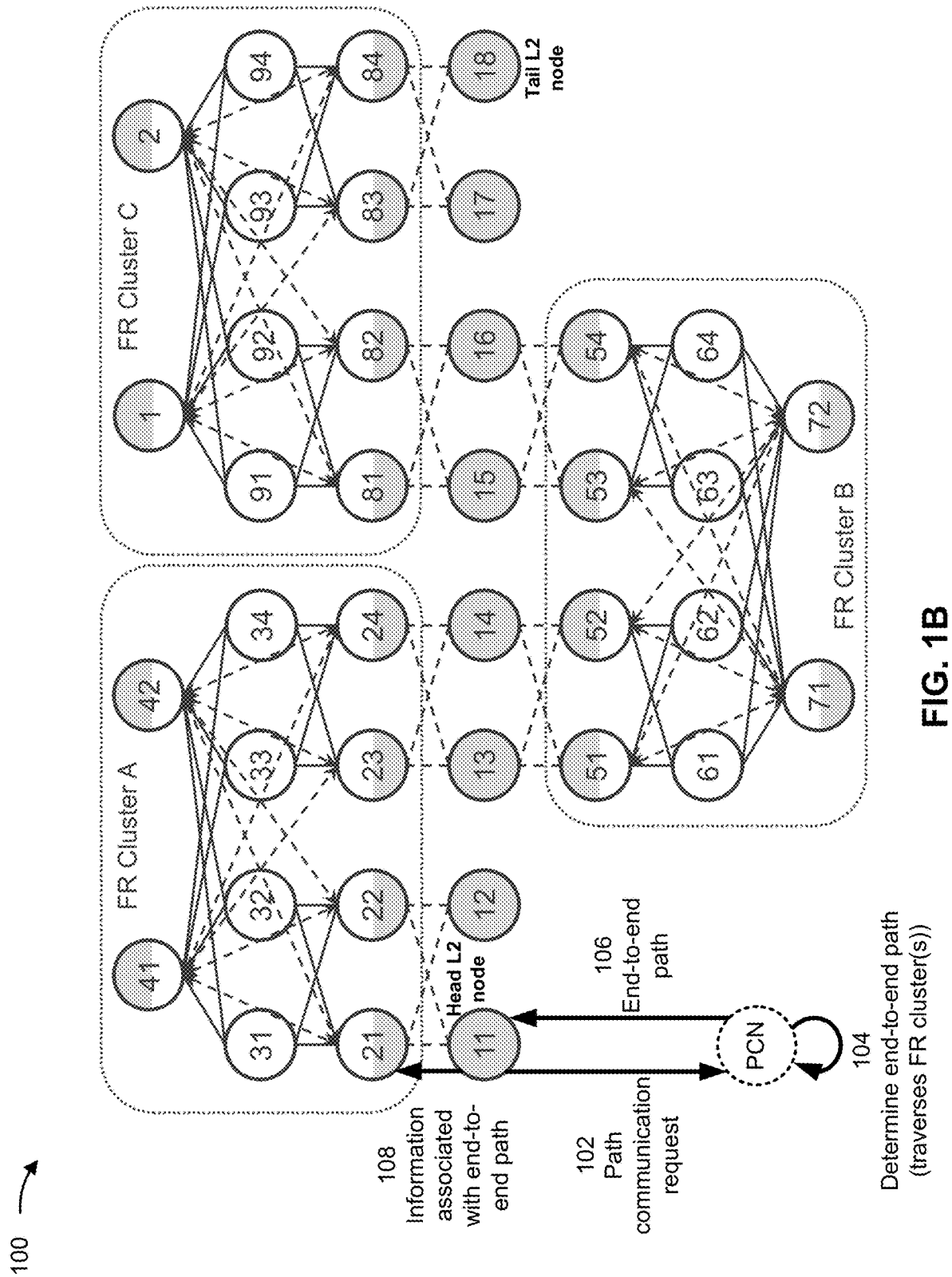

As shown in FIG. 1B, the IS-IS FR network may additionally include a path computation node (shown as a PCN node, with a dashed outline). The path computation node may include a path computation engine (PCE) and may be configured to determine a topology of the IS-IS FR network, such as by communicating (e.g., using a communication protocol, such as border gateway protocol link-state (BGP-LS)) with the plurality of nodes of the IS-IS FR network (e.g., the plurality of L1 nodes, the plurality of L2 nodes, and the plurality of L1/L2 nodes). Accordingly, the path computation node may be configured to determine respective intra-FR topologies of L1 nodes and L1/L2 nodes of individual FR clusters within the IS-IS FR network (e.g., a plurality of L1 topologies of the IS-IS FR network), an inter-FR topology of the L2 nodes and the L1/L2 nodes of the IS-IS FR network (e.g., an L2 topology of the IS-IS FR network), and/or an overall topology (e.g., an L1/L2 topology of the IS-IS FR network) of the plurality of nodes of the IS-IS FR network.

As further shown in FIG. 1B, and by reference number 102, the head L2 node (e.g., the L2 node 11) may send a path communication request to the path computation node. The head L2 node may send the path communication request to the path computation node via a link (e.g., an L2 link) between the head L2 node and the path computation node. Accordingly, the path computation node may receive the path communication request from the head L2 node (e.g., via the link).

The path communication request may be a request for a path from the head L2 node to the tail L2 node (e.g., the L2 node 18). In some implementations, the path communication request may indicate that the path is to traverse at least one FR cluster of the IS-IS FR network. That is, the path communication request may indicate that the path is to identify one or more L1 links (e.g., between L1 nodes and/or L1/L2 nodes) of at least one FR cluster that are to be traversed (e.g., from the head L2 node to the tail L2 node). Additionally, or alternatively, the path communication request may indicate that the path is to traverse at least one particular FR cluster of the IS-IS FR network and/or that the path is to not traverse at least one particular FR cluster of the IS-IS FR network. In some implementations, the path communication request may be a path computation element protocol (PCEP) message (e.g., where the PCEP is extended to support a message that requests traversal across at least one particular FR in the path, and requests inclusions and/or exclusions of at least one particular FR cluster in the path).

As shown by reference number 104, the path computation node may determine (e.g., based on the path communication request, such as based on the path communication request indicating that the path is to traverse at least one FR cluster of the IS-IS FR network) an end-to-end path (e.g., from the head L2 node to the tail L2 node). For example, the path computation node may process one or more topologies of the IS-IS FR network (e.g., one or more of the plurality of intra-FR topologies, the inter-FR topology, and/or the overall topology) to determine the end-to-end path. In some implementations, the end-to-end path may traverse one or more FR clusters of the IS-IS FR network. For example, for each FR cluster of the one or more FR clusters, the end-to-end path may traverse one or more L1 links (e.g., between L1 nodes and/or L1/L2 nodes) within the FR cluster. In this way, the end-to-end path may be referred to as including one or more L1 paths (e.g., comprising one or more L1 links within the one or more FR clusters).

In some implementations, when the communication request indicates that the path is to traverse at least one particular FR cluster, the end-to-end path may traverse the at least one particular FR cluster. Additionally, or alternatively, when the communication request indicates that the path is to not traverse at least one particular FR cluster, the end-to-end path may not traverse the at least one particular FR cluster (e.g., the end-to-end path may not traverse any L1 links within the at least one particular FR cluster).

As shown by reference number 106, the path computation node may send the end-to-end path (e.g., from the head L2 node to the tail L2 node) to the head L2 node (e.g., in response to the path computation request). The path computation node may send the end-to-end path to the head L2 node via the link between the head L2 node and the path computation node. Accordingly, the head L2 node may receive the end-to-end path from the path computation node (e.g., via the link).

In this way (e.g., by communicating with the path computation node), the head L2 node may determine the end-to-end path. For example, to determine the end-to-end path, the head L2 node may send the path computation request to the path computation node, and may receive (e.g., based on sending the path computation request) the end-to-end path from the path computation node.

As shown by reference number 108, the head L2 node may send information associated with the end-to-end path to another node identified in the end-to-end path (e.g., a next-hop node from the head L2 node in the end-to-end path, shown as the L1/L2 node 21). The head L2 node may send the information associated with the end-to-end path to the other node via a link (e.g., an L2 link) between the head L2 node and the other node. Accordingly, the other node may receive the information associated with the end-to-end path from the head L2 node (e.g., via the link).

Figure 1C:
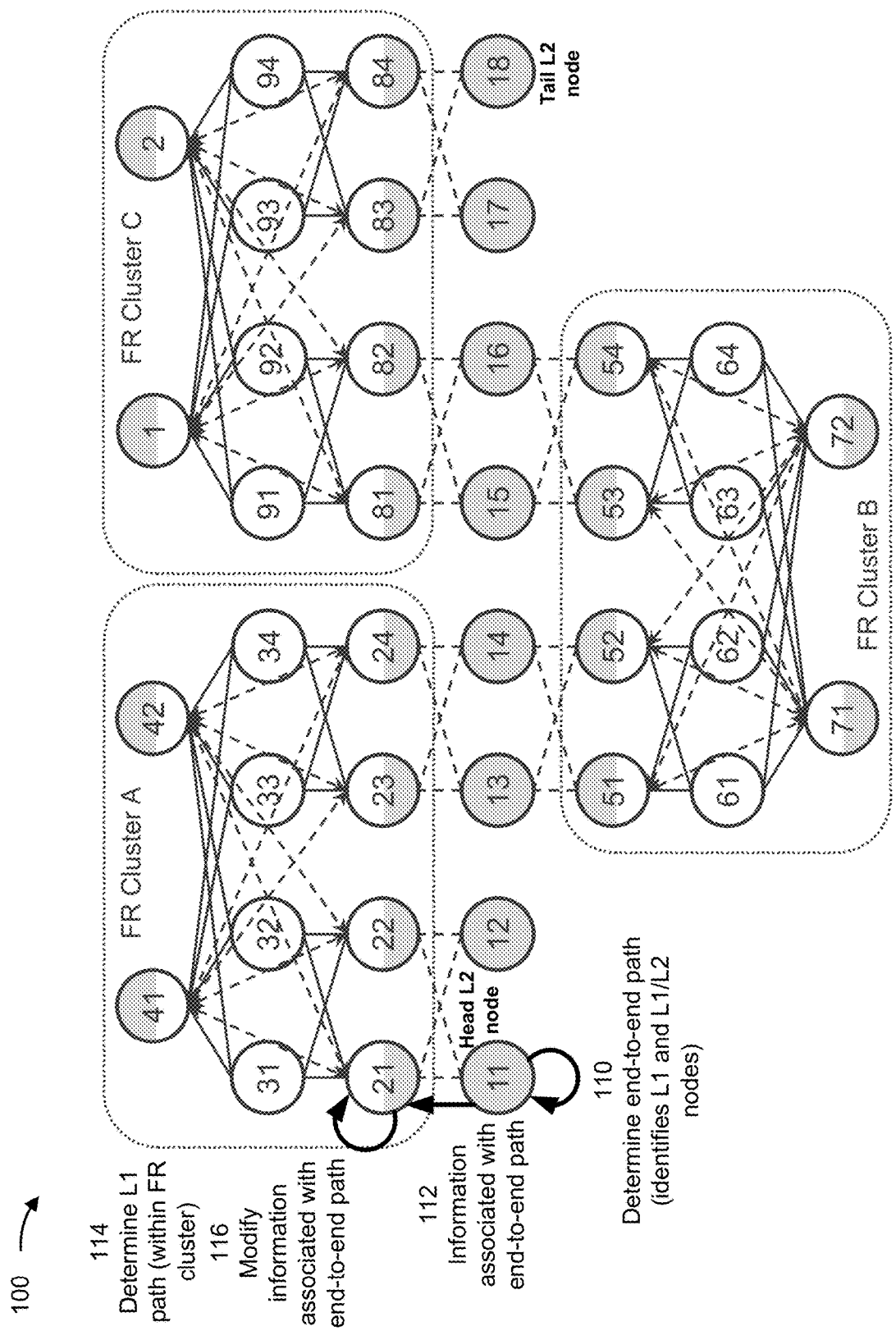
Figure 1D:
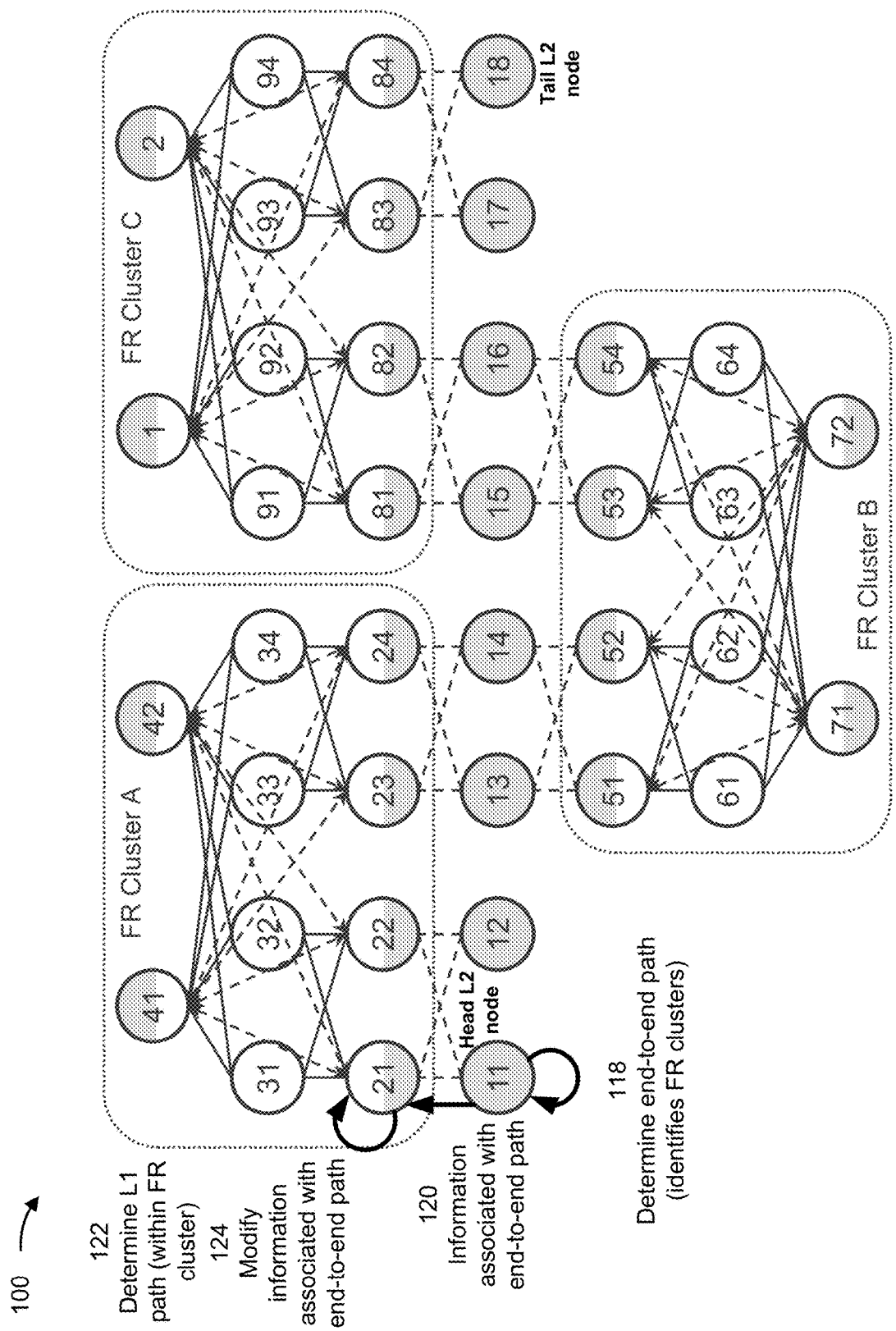
Figure 1E:
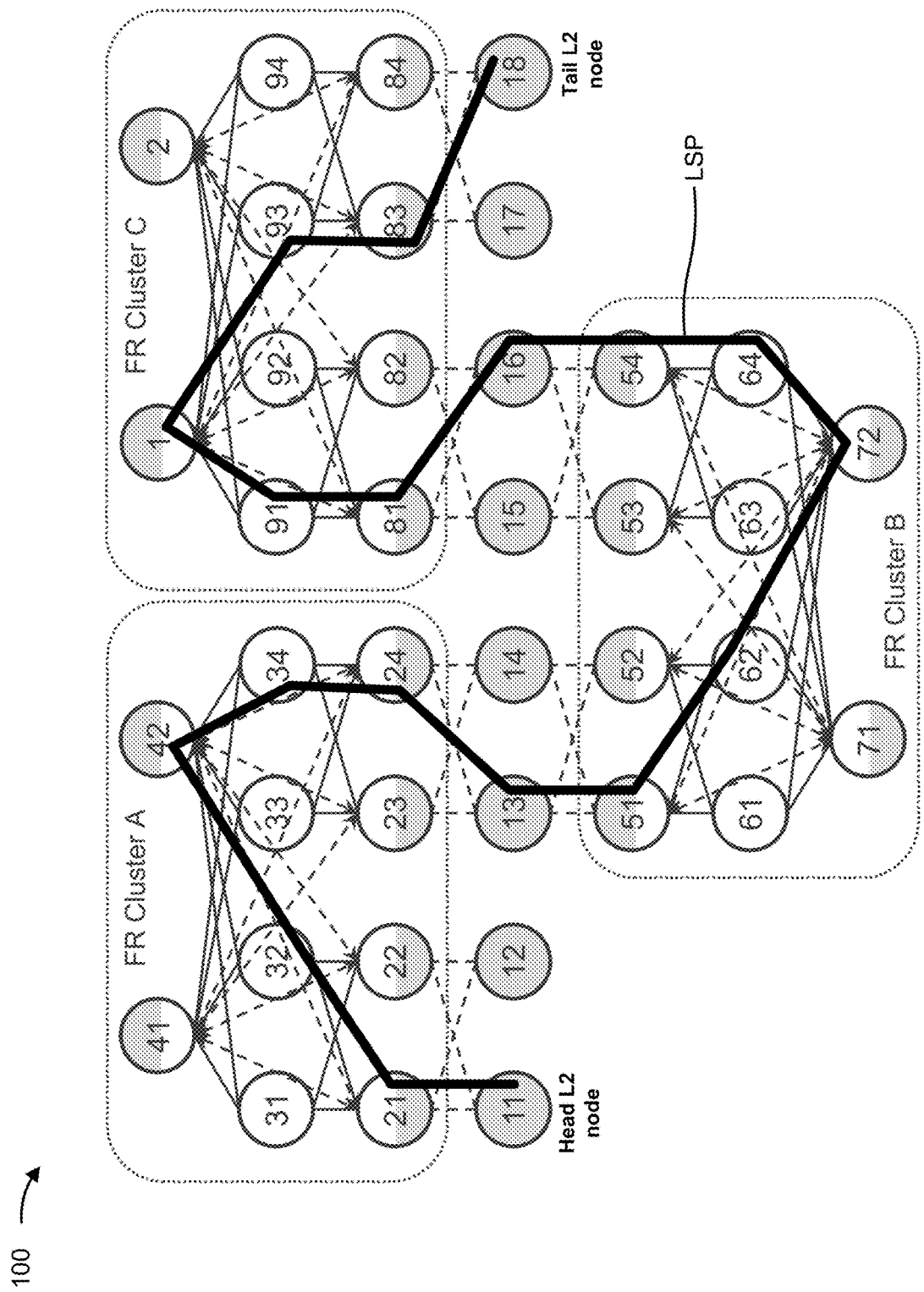

Sending the information associated with the end-to-end path to the other node may cause an LSP to be established (e.g., from the head L2 node to the tail L2 node, such as shown in FIG. 1E). For example, the head L2 node may include the information associated with the end-to-end path in an RSVP-TE message and may send the RSVP-TE message to the other node, which allows for an LSP to be established. Accordingly, because the LSP is established based on the end-to-end path, the LSP may traverse one or more FR clusters of the IS-IS FR network (e.g., the same one or more FR clusters that are traversed by the end-to-end path). For example, for each FR cluster of the one or more FR clusters, the LSP may traverse one or more L1 links (e.g., between L1 nodes and/or L1/L2 nodes) within the FR cluster (e.g., the same one or more L1 links within the FR cluster that are traversed by the end-to-end path). In this way, the LSP may be referred to as including one or more L1 paths (e.g., within the one or more FR clusters).

As an alternative to the operations shown in FIG. 1B, one or more of the operations shown in FIG. 1C may be performed by the head L2 node and/or one or more other nodes of the IS-IS FR network.

As shown in FIG. 1C, and by reference number 110, the head L2 node may determine an end-to-end path from the head L2 node to the tail L2 node (e.g., instead of communicating with a path computation node). In some implementations, because the head L2 node is an L2 node, the head L2 node may be configured to communicate (e.g., using a communication protocol, such as BGP-LS) with the other L2 nodes and the L1/L2 nodes of the IS-IS FR network. Accordingly, the head L2 node may determine an inter-FR topology of the L2 nodes and the L1/L2 nodes of the IS-IS FR network (e.g., an L2 topology of the IS-IS FR network), and may thereby determine the end-to-end path.

The end-to-end path may traverse L2 nodes and/or L1/L2 nodes of the IS-IS FR network. In some implementations, the end-to-end path may identify a set of two or more L1/L2 nodes that are associated with a particular FR cluster of the IS-IS FR network and that are connected by one or more L2 FR links. In a specific example, the head L2 node (e.g., the L2 node 11) may determine an end-to-end path to the tail L2 node (e.g., the L2 node 18), where the end-to-end path identifies (e.g., in a traversal sequence) L1/L2 node 21, L1/L2 node 42, L1/L2 node 24, L2 node 13, L1/L2 node 51, L1/L2 node 71, L1/L2 node 54, L2 node 16, L1/L2 node 81, L1/L2 node 2, L1/L2 node 83, and L2 node 18. The L1/L2 node 21, the L1/L2 node 42, and the L1/L2 node 24 are included in the FR cluster A and connected by first L2 FR links; the L1/L2 node 51, the L1/L2 node 71, and the L1/L2 node 54 are included in the FR cluster B and connected by second L2 FR links; and the L1/L2 node 81, the L1/L2 node 2, and the L1/L2 node 83 are included in the FR cluster C and connected by third L2 FR links.

As shown by reference number 112, the head L2 node may send information associated with the end-to-end path to another node identified in the end-to-end path (e.g., a next-hop node from the head L2 node in the end-to-end path). The head L2 node may send the information associated with the end-to-end path to the other node via a link (e.g., an L2 link) between the head L2 node and the other node. Accordingly, the other node may receive the information associated with the end-to-end path from the head L2 node (e.g., via the link). With respect to the specific example, as shown in FIG. 1C, the head L2 node (e.g., the L2 node 11) may send the information associated with the end-to-end path to the L1/L2 node 21 (e.g., because the L1/L2 node 21 is the next-hop node from the head L2 node in the end-to-end path).

The information associated with the end-to-end path may indicate the nodes of the end-to-end path, and may include additional information, such as whether consecutive L1/L2 nodes are connected by an L2 FR link (e.g., which indicates that the consecutive L1/L2 nodes are in the same FR cluster). Accordingly, the information associated with the end-to-end path may indicate a set of two or more L1/L2 nodes and that the set of two more L1/L2 nodes are connected by the one or more L2 FR links (e.g., within an FR cluster). Further, the information associated with the end-to-end path may indicate that a path between consecutive L1/L2 nodes of the set of two or more L1/L2 nodes, within the end-to-end path, is to be expanded (e.g., to allow traversal via one or more L1 nodes of the FR cluster between the consecutive L1/L2 nodes). For example, the information associated with the end-to-end path may include a flag (e.g., a hop-attribute flag) to indicate a hop expansion for an L1/L2 node and/or a flag indicating that the L1/L2 node is an ingress node or an egress node of an FR cluster. The RSVP-TE protocol may be extended to provide such functionality (e.g., within explicit route objects (EROs) and record route objects (RROs)).

Sending the information associated with the end-to-end path to the other node (e.g., the L1/L2 node 21) may cause an LSP to be established (e.g., from the head L2 node to the tail L2 node, such as shown in FIG. 1E). For example, the head L2 node may include the information associated with the end-to-end path in an RSVP-TE message and may send the RSVP-TE message to the other node, which allows for an LSP to be established.

As shown by reference number 114, sending the information associated with the end-to-end path to the other node allows an ingress L1/L2 node (e.g., of a set of two or more L1/L2 nodes that are associated with a particular FR cluster of the IS-IS FR network and that are connected by one or more L2 FR links) to determine an L1 path from the ingress L1/L2 node to an egress L1/L2 node (e.g., of the set of two or more L1/L2 nodes), via a set of one or more L1 links of the particular FR cluster. For example, because the ingress L1/L2 node of the particular FR cluster is an L1/L2 node, the ingress L1/L2 node may be configured to communicate (e.g., using a communication protocol, such as BGP-LS) with the L1 nodes and the other L1/L2 nodes of the particular FR cluster. Accordingly, the ingress L1/L2 node may determine an intra-FR topology of the L1 nodes and the L1/L2 nodes of the particular FR cluster (e.g., an L1 topology of the particular FR cluster), and may thereby determine the L1 path (e.g., that comprises one or more L1 links from the ingress L1/L2 node to the egress L1/L2 node).

As shown by reference number 116, the ingress L1/L2 node may therefore modify the information associated with the end-to-end path to indicate the L1 path. For example, the ingress L1/L2 node may remove all L1/L2 nodes, from the ingress L1/L2 node to the egress L1/L2 node of the particular FR cluster, from the information associated with the end-to-end path, and may include the L1 path (e.g., in the place of the removed L1/L2 nodes).

With respect to the specific example, as shown in FIG. 1C, the L1/L2 node 21, which received the information associated with the end-to-end path from the head L2 node (e.g., the L2 node 11), is an ingress L1/L2 node for the FR cluster A. Accordingly, the L1/L2 node 21 may determine an L1 path from the L1/L2 node 21 to the L1/L2 node 24 (e.g., the egress L1/L2 node of the FR cluster A, as indicated in the information associated with the end-to-end path). The L1 path may traverse, for example, L1 node 32, L1/L2 node 42, L1 node 34, and L1/L2 node 24 (e.g., via L1 links). The L1/L2 node 21 may therefore modify the information associated with the end-to-end path to indicate the L1 path. For example, the L1/L2 node 21 may remove L1/L2 nodes 21, 42, and 24 from the end-to-end path (e.g., that includes a traversal sequence of L1/L2 node 21, L1/L2 node 42, L1/L2 node 24, L2 node 13, L1/L2 node 51, L1/L2 node 71, L1/L2 node 54, L2 node 16, L1/L2 node 81, L1/L2 node 2, L1/L2 node 83, and L2 node 18), and may include the L1 path (e.g., in place of the removed L1/L2 nodes). Accordingly, the information associated with the end-to-end path may indicate a traversal sequence, from the L1/L2 node 21, of L1 node 32, L1/L2 node 42, L1 node 34, L1/L2 node 24, L2 node 13, L1/L2 node 51, L1/L2 node 71, L1/L2 node 54, L2 node 16, L1/L2 node 81, L1/L2 node 2, L1/L2 node 83, and L2 node 18.

The ingress L1/L2 node may then send (e.g., after modifying the information associated with the end-to-end path) the information associated with the end-to-end path to another node identified in the end-to-end path (e.g., a next-hop node from ingress L1/L2 node in the end-to-end path). With respect to the specific example, as shown in FIG. 1C, the L1/L2 node 21 may send the information associated with the end-to-end path to the L1 node 32 (e.g., because the L1 node 32 is the next-hop node from the L1/L2 node 21 in the end-to-end path). In this way, the ingress L1/L2 node facilitates establishment of the LSP (e.g., because the information associated with the end-to-end path may be iteratively passed to a next-hop node in the end-to-end path, where an ingress L1/L2 node of an FR cluster modifies the information associated with the end-to-end path to indicate an L1 path through the FR cluster).

Accordingly, because the LSP is established based on the end-to-end path (e.g., that is modified by ingress L1/L2 nodes of FR clusters to traverse the FR clusters), the LSP may traverse one or more FR clusters of the IS-IS FR network. For example, for each FR cluster of the one or more FR clusters, the LSP may traverse one or more L1 links (e.g., between L1 nodes and/or L1/L2 nodes) within the FR cluster (e.g., an L1 path determined by the ingress L1/L2 node of the FR cluster). In this way, the LSP may be referred to as including one or more L1 paths (e.g., within the one or more FR clusters).

As an alternative to the operations shown in FIGS. 1B and 1C, one or more of the operations shown in FIG. 1D may be performed by the head L2 node and/or one or more other nodes of the IS-IS FR network.

As shown in FIG. 1D, and by reference number 118, the head L2 node may determine an end-to-end path from the head L2 node to the tail L2 node (e.g., instead of communicating with a path computation node). In some implementations, because the head L2 node is an L2 node, the head L2 node may be configured to communicate (e.g., using a communication protocol, such as BGP-LS) with the other L2 nodes and the L1/L2 nodes of the IS-IS FR network. Accordingly, the head L2 node may determine an inter-FR topology of the L2 nodes and the L1/L2 nodes of the IS-IS FR network (e.g., an L2 topology of the IS-IS FR network), and may thereby determine the end-to-end path.

The end-to-end path may traverse one or more L2 nodes and/or one or more FR clusters of the IS-IS FR network. That is, the end-to-end path may identify one or more particular L2 nodes and/or one or more particular FR clusters (but not L1 nodes or L1/L2 nodes of the particular clusters). In a specific example, the head L2 node (e.g., the L2 node 11) may determine an end-to-end path to the tail L2 node (e.g., the L2 node 18), where the end-to-end path identifies (e.g., in a traversal sequence) FR cluster A, FR cluster B, FR cluster C, and L2 node 18.

As shown by reference number 120, the head L2 node may send information associated with the end-to-end path to another node identified in the end-to-end path (e.g., a next-hop node from the head L2 node in the end-to-end path). The head L2 node may send the information associated with the end-to-end path to the other node via a link (e.g., an L2 link) between the head L2 node and the other node. Accordingly, the other node may receive the information associated with the end-to-end path from the head L2 node (e.g., via the link). With respect to the specific example, as shown in FIG. 1D, the head L2 node (e.g., the L2 node 11) may send the information associated with the end-to-end path to the L1/L2 node 21 (e.g., because the end-to-end path indicates that the FR cluster A is a next hop, and the L1/L2 node 21 is an ingress L1/L2 node of the FR cluster A).

The information associated with the end-to-end path may indicate the one or more L2 nodes and/or one or more FR clusters of the end-to-end path, and may include additional information, such as whether the end-to-end path includes FR clusters (e.g., a path-attribute flag) and whether a particular hop in the end-to-end path is an L2 node or an FR cluster (e.g., as a hop-attribute flag). The PCEP and RSVP-TE protocols may be extended to provide such functionality (e.g., within node capability signaling, and/or within EROs and RROs).

In some implementations, sending the information associated with the end-to-end path to the other node (e.g., the L1/L2 node 21) may cause an LSP to be established (e.g., from the head L2 node to the tail L2 node, such as shown in FIG. 1E). For example, the head L2 node may include the information associated with the end-to-end path in an RSVP-TE message and may send the RSVP-TE message to the other node, which allows for an LSP to be established.

As shown by reference number 122, sending the information associated with the end-to-end path to the other node allows an ingress L1/L2 node of a particular FR cluster to determine an L1 path from the ingress L1/L2 node to an egress L1/L2 node of the particular FR cluster via a set of one or more L1 links of the particular FR cluster. For example, because the ingress L1/L2 node of the particular FR cluster is an L1/L2 node, the ingress L1/L2 node may be configured to communicate (e.g., using a communication protocol, such as BGP-LS) with the L1 nodes and the other L1/L2 nodes of the particular FR cluster. Accordingly, the ingress L1/L2 node may determine an intra-FR topology of the L1 nodes and the L1/L2 nodes of the particular FR cluster (e.g., an L1 topology of the particular FR cluster), and may thereby determine the L1 path (e.g., that comprises one or more L1 links from the ingress L1/L2 node to the egress L1/L2 node).

As shown by reference number 124, the ingress L1/L2 node may therefore modify the information associated with the end-to-end path to indicate the L1 path. For example, the ingress L1/L2 node may remove the particular FR cluster from the information associated with the end-to-end path, and may include the L1 path (e.g., in the place of the particular FR cluster that has been removed).

Additionally, the ingress L1/L2 node may determine an L2 path from the egress L1/L2 node of the particular FR cluster to another FR cluster (e.g., when the next-hop in the end-to-end path, after the L1 path, is the other FR cluster) via a set of one or more L2 links between the particular FR cluster and the other FR cluster. For example, because the ingress L1/L2 node of the particular FR cluster is an L1/L2 node, the ingress L1/L2 node may be configured to communicate (e.g., using a communication protocol, such as BGP-LS) with the L2 nodes and the other L1/L2 nodes of the IS-IS FR network. Accordingly, the ingress L1/L2 node may determine an inter-FR topology of the L2 nodes and the L1/L2 nodes of the IS-IS FR network (e.g., an L2 topology of the IS-IS FR network), and may thereby determine the L2 path (e.g., that comprises one or more L2 links from the egress L1/L2 node of the particular FR cluster to an ingress L1/L2 node of the other FR cluster).

The ingress L1/L2 node may therefore modify the information associated with the end-to-end path to indicate the L2 path. For example, the ingress L1/L2 node may append the L2 path to the L1 path, such that the end-to-end path indicates, in a traversal sequence, the L1 path and then the L2 path.

With respect to the specific example, as shown in FIG. 1D, the L1/L2 node 21, which received the information associated with the end-to-end path from the head L2 node (e.g., the L2 node 11), is an ingress L1/L2 node for the FR cluster A. Accordingly, the L1/L2 node 21 may determine an L1 path from the L1/L2 node 21 to the L1/L2 node 24 (e.g., the egress L1/L2 node of the FR cluster A). The L1 path may traverse, for example, L1 node 32, L1/L2 node 42, L1 node 34, and L1/L2 node 24 (e.g., via L1 links). The L1/L2 node 21 may therefore modify the information associated with the end-to-end path to indicate the L1 path. For example, the L1/L2 node 21 may remove FR cluster A from the end-to-end path (e.g., that includes a traversal sequence of FR cluster A, FR cluster B, FR cluster C, and L2 node 18), and may include the L1 path (e.g., in place of the removed FR cluster A). Accordingly, the information associated with the end-to-end path may indicate a traversal sequence, from the L1/L2 node 21, of L1 node 32, L1/L2 node 42, L1 node 34, L1/L2 node 24, FR cluster B, FR cluster C, and L2 node 18.

Additionally, the L1/L2 node 21 may determine an L2 path from the L1/L2 node 24 (e.g., the egress L1/L2 node of the FR cluster A) to the L1/L2 node 51 (e.g., the ingress L1/L2 node of the FR cluster B). The L2 path may traverse, for example, L2 node 13 and L1/L2 node 51 (e.g., via L2 links). The L1/L2 node 21 may therefore modify the information associated with the end-to-end path to indicate the L2 path. For example, the L1/L2 node 21 may append the L2 path to the L1 path, such that the information associated with the end-to-end path may indicate a traversal sequence, from the L1/L2 node 21, of L1 node 32, L1/L2 node 42, L1 node 34, L1/L2 node 24, L2 node 13, L1/L2 node 51, FR cluster B, FR cluster C, and L2 node 18.

The ingress L1/L2 node may then send (e.g., after modifying the information associated with the end-to-end path) the information associated with the end-to-end path to another node identified in the end-to-end path (e.g., a next-hop node from the ingress L1/L2 node in the end-to-end path). With respect to the specific example, as shown in FIG. 1D the L1/L2 node 21 may send the information associated with the end-to-end path to the L1 node 32 (e.g., because the L1 node 32 is the next-hop node from the L1/L2 node 21 in the end-to-end path). In this way, the ingress L1/L2 facilitates establishment of the LSP (e.g., because the information associated with the end-to-end path may be iteratively passed to a next-hop node in the end-to-end path, where an ingress L1/L2 node of an FR cluster modifies the information associated with the end-to-end path to indicate an L1 path through the FR cluster and/or to indicate an L2 path from the FR cluster to another FR cluster).

Accordingly, because the LSP is established based on the end-to-end path (e.g., that is modified by ingress L1/L2 nodes of FR clusters to traverse the FR clusters), the LSP may traverse one or more FR clusters of the IS-IS FR network. For example, for each FR cluster of the one or more FR clusters, the LSP may traverse one or more L1 links (e.g., between L1 nodes and/or L1/L2 nodes) within the FR cluster (e.g., an L1 path determined by the ingress L1/L2 node of the FR cluster). In this way, the LSP may be referred to as including one or more L1 paths (e.g., within the one or more FR clusters).

FIG. 1E shows an example LSP that may be established by any of the respective operations described herein in relation to FIGS. 1B, 1C, and 1D. As shown in FIG. 1E, the LSP may extend from a head L2 node (e.g., the L2 node 11) to a tail L2 node (e.g., the L2 node 18), wherein the LSP traverses one or more FR clusters (e.g., traverses one or more L1 links within each of the one or more FR clusters).

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
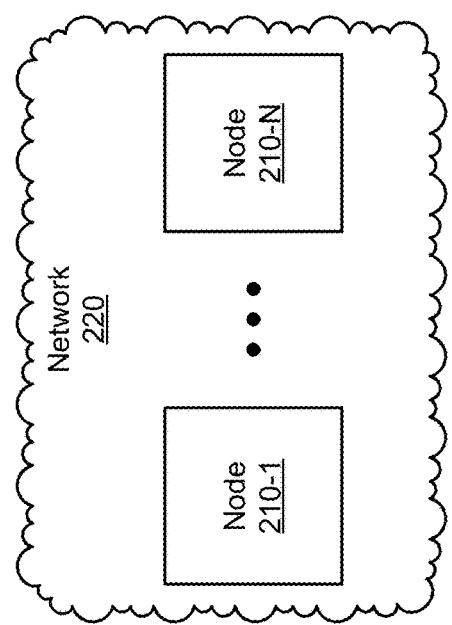
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a group of nodes 210 (shown as node 210-1 through node 210-N), and a network 220. Devices of environment 200 may interconnect via wired connections, wireless connections, or a combination of wired and wireless connections.

The node 210 includes one or more devices capable of receiving, processing, storing, routing, and/or providing information, such as information described herein. For example, the node 210 may include a router, such as a label switching router (LSR), a label edge router (LER), an ingress router, an egress router, a provider router (e.g., a provider edge router, a provider core router, etc.), a virtual router, and/or the like. Additionally, or alternatively, the node 210 may include a gateway, a switch, a firewall, a hub, a bridge, a reverse proxy, a server (e.g., a proxy server, a cloud server, a data center server, etc.), a load balancer, and/or a similar device. In some implementations, the node 210 may be a physical device implemented within a housing, such as a chassis. In some implementations, the node 210 may be a virtual device implemented by one or more computer devices of a cloud computing environment or a data center. In some implementations, a group of nodes 210 may be a group of data center nodes that are used to route traffic flow through network 220. In some implementations, the node 210 may be an L1 node, an L2 node, or an L1/L2 node (e.g., when the network 220 includes an IS-IS FR network).

The network 220 includes one or more wired and/or wireless networks. For example, the network 220 may include an IS-IS FR network, a packet switched network, a cellular network (e.g., a fifth generation (5G) network, a fourth generation (4G) network, such as a long-term evolution (LTE) network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
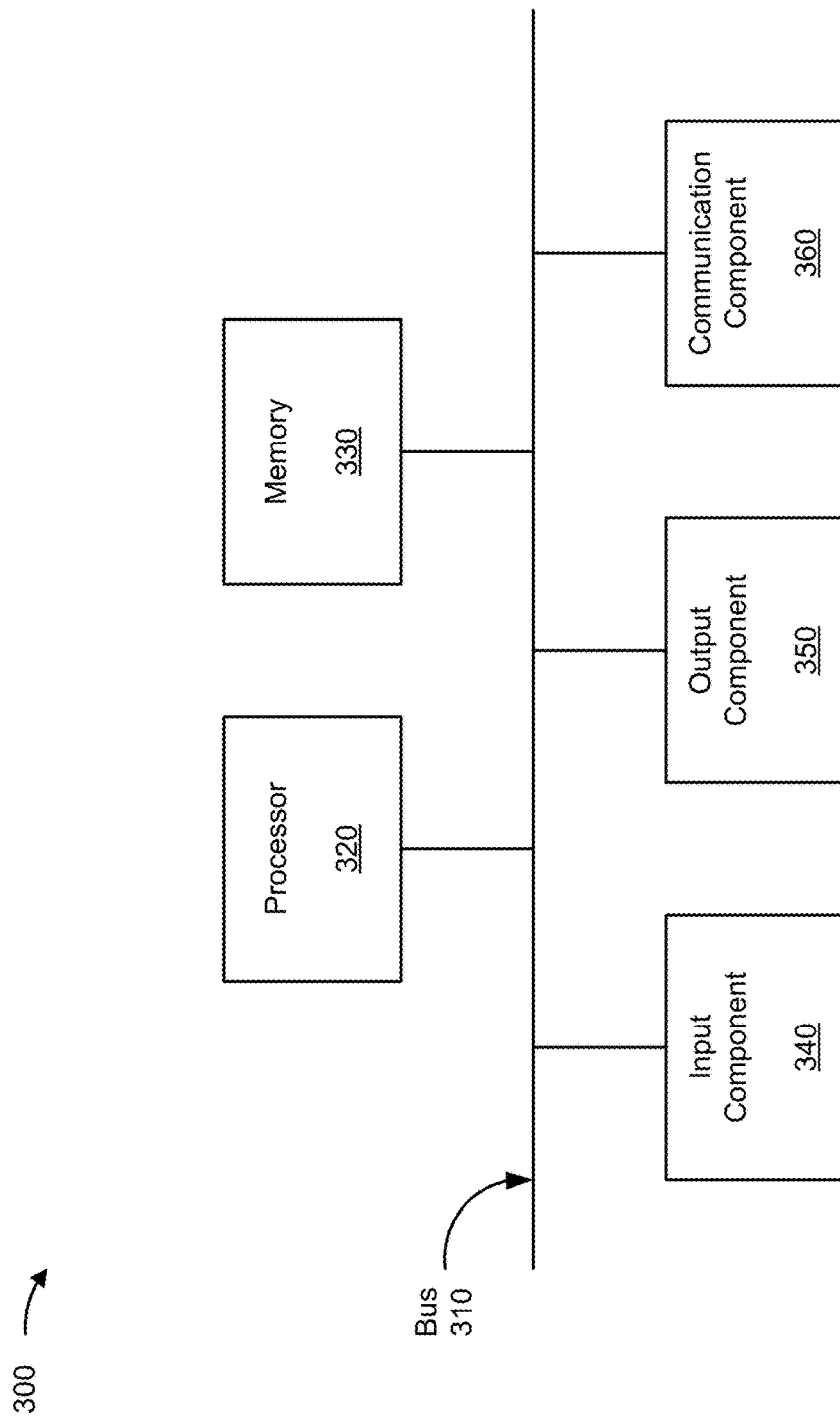
FIG. 3 is a diagram of example components of a device associated with RSVP-TE path computation across FR clusters of an IS-IS FR network.

FIG. 3 is a diagram of example components of a device 300 associated with RSVP-TE path computation across FR clusters of an IS-IS FR network. The device 300 may correspond to node 210. In some implementations, node 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
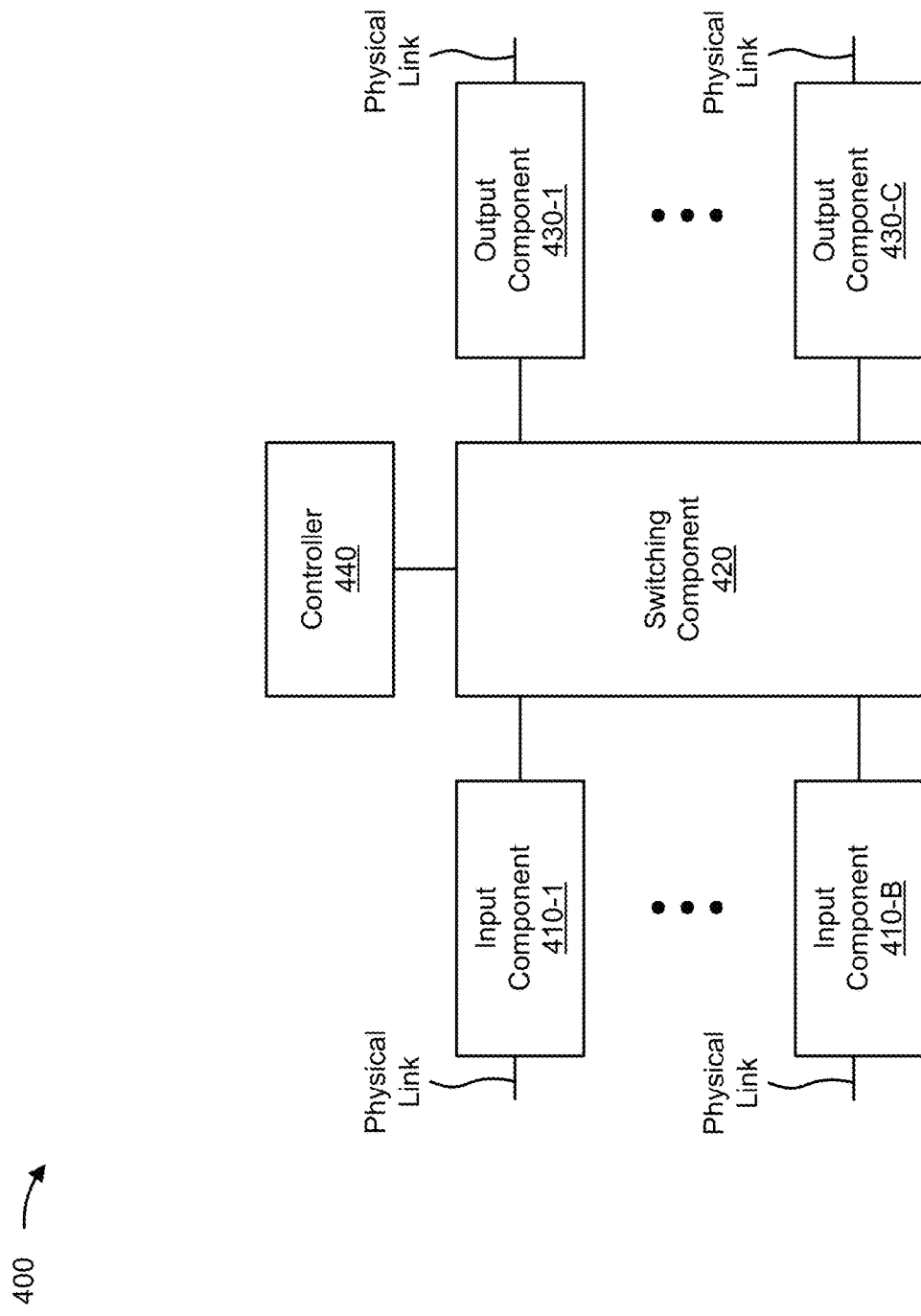
FIG. 4 is a diagram of example components of a device associated with RSVP-TE path computation across FR clusters of an IS-IS FR network.

FIG. 4 is a diagram of example components of a device 400 associated with RSVP-TE path computation across FR clusters of an IS-IS FR network. Device 400 may correspond to node 210. In some implementations, node 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
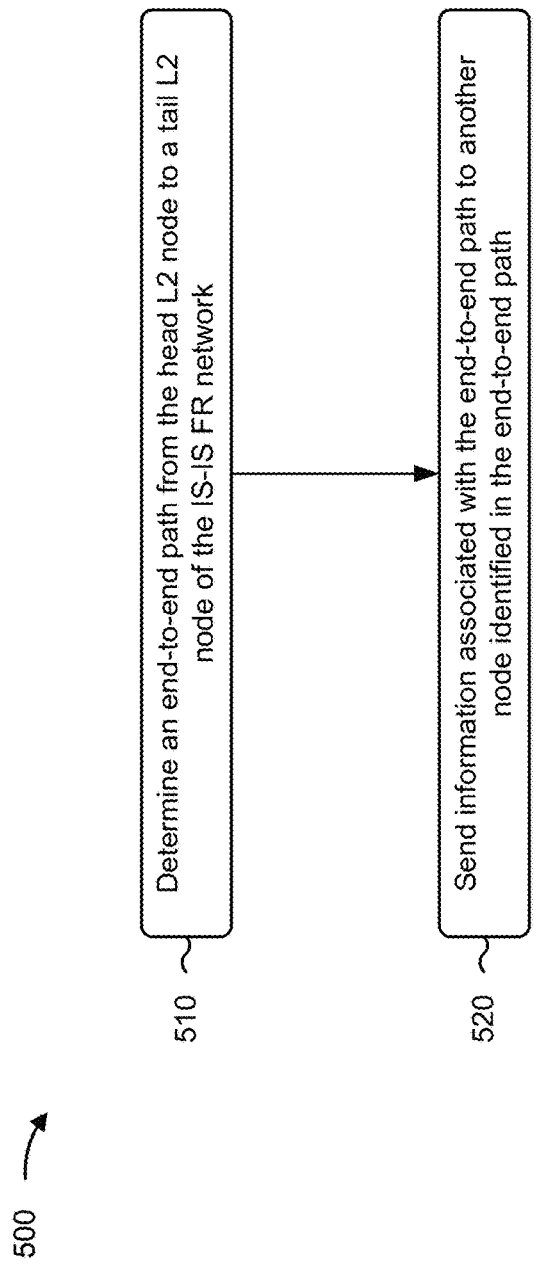
FIG. 5 is a flowchart of an example process associated with RSVP-TE path computation across FR clusters of an IS-IS FR network.

FIG. 5 is a flowchart of an example process 500 associated with RSVP-TE path computation across FR clusters of an IS-IS FR network. In some implementations, one or more process blocks of FIG. 5 are performed by a head L2 node (e.g., a node 210 configured as a head L2 node) of an IS-IS FR network. In some implementations, one or more process blocks of FIG. 5 are performed by another device or a group of devices separate from or including the network device, such as another node (e.g., that is configured as an L1 node, an L2 node, or an L1/L2 node) of the IS-IS FR network. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include determining an end-to-end path from the head L2 node to a tail L2 node of the IS-IS FR network (block 510). For example, the head L2 node may determine an end-to-end path from the head L2 node to a tail L2 node of the IS-IS FR network, as described above. In some implementations, the IS-IS FR network includes a plurality of L2 nodes and a plurality of FR clusters that each comprise a plurality L1 nodes and a plurality of L1/L2 nodes connected by a plurality of L1 links.

As further shown in FIG. 5, process 500 may include sending information associated with the end-to-end path to another node identified in the end-to-end path (block 520). For example, the head L2 node may send information associated with the end-to-end path to another node identified in the end-to-end path, as described above. In some implementations, this causes an LSP to be established from the head L2 node to the tail L2 node, wherein the LSP traverses one or more L1 links within an FR cluster of the IS-IS FR network.

Process 500 may include additional implementations, such as any single implementation or any combination of implementations described below and/or in connection with one or more other processes described elsewhere herein.

In a first implementation, the end-to-end path identifies a set of two or more L1/L2 nodes that are associated with a particular FR cluster of the IS-IS FR network and that are connected by one or more L2 FR links, and the information associated with the end-to-end path indicates the set of two or more L1/L2 nodes and that the set of two more L1/L2 nodes are connected by the one or more L2 FR links.

In a second implementation, alone or in combination with the first implementation, sending the information associated with the end-to-end path to the other node allows an ingress L1/L2 node, of the set of two or more L1/L2 nodes, to determine an L1 path from the ingress L1/L2 node to an egress L1/L2 node, of the set of two or more L1/L2 nodes, via a set of one or more L1 links of the particular FR cluster, modify the information associated with the end-to-end path to indicate the L1 path, and send the information associated with the end-to-end path to a node of the L1 path to facilitate establishment of the LSP from the head L2 node to the tail L2 node.

In a third implementation, alone or in combination with one or more of the first and second implementations, the end-to-end path identifies a particular FR cluster of the IS-IS FR network, and the information associated with the end-to-end path indicates the particular FR cluster.

In a fourth implementation, alone or in combination with one or more of the first through third implementations, sending the information associated with the end-to-end path to the other node allows an ingress L1/L2 node of the particular FR cluster to determine an L1 path from the ingress L1/L2 node to an egress L1/L2 node, of the particular FR, via a set of one or more L1 links of the particular FR cluster, modify the information associated with the end-to-end path to indicate the L1 path, and send the information associated with the end-to-end path to a node of the L1 path to facilitate establishment of the LSP from the head L2 node to the tail L2 node.

In a fifth implementation, alone or in combination with one or more of the first through fourth implementations, determining the end-to-end path comprises sending, to a path computation node associated with the IS-IS FR network, a path computation request for a path from the head L2 node to the tail L2 node, and receiving, based on sending the path computation request, the end-to-end path from the path computation node, wherein the end-to-end path traverses the one or more L1 links within the FR cluster that are traversed by the LSP.

In a sixth implementation, alone or in combination with one or more of the first through fifth implementations, the path computation request indicates that the path is to traverse at least one FR cluster of the IS-IS FR network.

In a seventh implementation, alone or in combination with one or more of the first through sixth implementations, the path computation request indicates that the path is to traverse at least one particular FR cluster of the IS-IS FR network, including the FR cluster.

In an eighth implementation, alone or in combination with one or more of the first through seventh implementations, the path computation request indicates that the path is to not traverse at least one particular FR cluster of the IS-IS FR network, and the end-to-end path does not traverse any L1 links within the at least one particular FR cluster.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a head Level 2 (L2) node of an intermediate system-intermediate system (IS-IS) flood reflection (FR) network, an end-to-end path from the head L2 node to a tail L2 node of the IS-IS FR network,
    wherein the IS-IS FR network includes a plurality of L2 nodes and a plurality of FR clusters that each comprises a plurality of Level 1 (L1) nodes and a plurality of L1 and L2 (L1/L2) nodes connected by a plurality of L1 links; and
    sending, by the head L2 node, information associated with the end-to-end path to another node identified in the end-to-end path to cause a label switched path (LSP) to be established from the head L2 node to the tail L2 node,
    wherein the LSP traverses one or more L1 links within an FR cluster of the IS-IS FR network.

2. The method of claim 1, wherein the end-to-end path identifies a set of two or more L1/L2 nodes that are associated with a particular FR cluster of the IS-IS FR network and that are connected by one or more L2 FR links, and
    wherein the information associated with the end-to-end path indicates the set of two or more L1/L2 nodes and that the set of two more L1/L2 nodes are connected by the one or more L2 FR links.

3. The method of claim 2, wherein sending the information associated with the end-to-end path to the other node allows an ingress L1/L2 node, of the set of two or more L1/L2 nodes, to:
    determine an L1 path from the ingress L1/L2 node to an egress L1/L2 node, of the set of two or more L1/L2 nodes, via a set of one or more L1 links of the particular FR cluster;
    modify the information associated with the end-to-end path to indicate the L1 path; and
    send the information associated with the end-to-end path to a node of the L1 path to facilitate establishment of the LSP from the head L2 node to the tail L2 node.

4. The method of claim 1, wherein the end-to-end path identifies a particular FR cluster of the IS-IS FR network, and
    wherein the information associated with the end-to-end path indicates the particular FR cluster.

5. The method of claim 4, wherein sending the information associated with the end-to-end path to the other node allows an ingress L1/L2 node of the particular FR cluster to:
    determine an L1 path from the ingress L1/L2 node to an egress L1/L2 node, of the particular FR, via a set of one or more L1 links of the particular FR cluster;
    modify the information associated with the end-to-end path to indicate the L1 path; and
    send the information associated with the end-to-end path to a node of the L1 path to facilitate establishment of the LSP from the head L2 node to the tail L2 node.

6. The method of claim 1, wherein determining the end-to-end path comprises:
    sending, to a path computation node associated with the IS-IS FR network, a path computation request for a path from the head L2 node to the tail L2 node; and
    receiving, based on sending the path computation request, the end-to-end path from the path computation node,
    wherein the end-to-end path traverses the one or more L1 links within the FR cluster that are traversed by the LSP.

7. The method of claim 6, wherein the path computation request indicates that the path is to traverse at least one FR cluster of the IS-IS FR network.

8. The method of claim 6, wherein the path computation request indicates that the path is to traverse at least one particular FR cluster of the IS-IS FR network, including the FR cluster.

9. The method of claim 6, wherein the path computation request indicates that the path is to not traverse at least one particular FR cluster of the IS-IS FR network, and
    wherein the end-to-end path does not traverse any L1 links within the at least one particular FR cluster.

10. A non-transitory computer-readable medium storing a set of instructions, the set of instructions comprising:
    one or more instructions that, when executed by one or more processors of a head Level 2 (L2) node of an intermediate system-intermediate system (IS-IS) flood reflection (FR) network, cause the head L2 node to:
    determine an end-to-end path from the head L2 node to a tail L2 node of the IS-IS FR network, wherein the IS-IS FR network includes a plurality of FR clusters that each comprises comprise a plurality of Level 1 (L1) links; and
    send information associated with the end-to-end path to another node identified in the end-to-end path to cause a label switched path (LSP) to be established from the head L2 node to the tail L2 node,
    wherein the LSP traverses one or more L1 links of the plurality of L1 links the IS-IS FR network.

11. The non-transitory computer-readable medium of claim 10, wherein the end-to-end path identifies a set of two or more L1/L2 nodes that are associated with a particular FR cluster of the IS-IS FR network and that are connected by one or more L2 FR links,
    wherein the information associated with the end-to-end path indicates the set of two or more L1/L2 nodes and that the set of two more L1/L2 nodes are connected by the one or more L2 FR links.

12. The non-transitory computer-readable medium of claim 11, wherein sending the information associated with the end-to-end path to the other node allows an ingress L1/L2 node, of the set of two or more L1/L2 nodes, to:
  determine an L1 path from the ingress L1/L2 node to an egress L1/L2 node, of the set of two or more L1/L2 nodes, via a set of one or more L1 links of the particular FR cluster; and
  modify the information associated with the end-to-end path to indicate the L1 path to facilitate establishment of the LSP from the head L2 node to the tail L2 node.

13. The non-transitory computer-readable medium of claim 10, wherein the end-to-end path identifies a particular FR cluster of the IS-IS FR network, and
  wherein the information associated with the end-to-end path indicates the particular FR cluster.

14. The non-transitory computer-readable medium of claim 13, wherein sending the information associated with the end-to-end path to the other node allows an ingress L1/L2 node of the particular FR cluster to:
  determine an L1 path from the ingress L1/L2 node to an egress L1/L2 node, of the particular FR, via a set of one or more L1 links of the particular FR cluster; and
  modify the information associated with the end-to-end path to indicate the L1 path to facilitate establishment of the LSP from the head L2 node to the tail L2 node.

15. The non-transitory computer-readable medium of claim 10, wherein the one or more instructions, that cause the head L2 node to determine the end-to-end path, cause the head L2 node to:
  send a path computation request for a path from the head L2 node to the tail L2 node; and
  receive, based on sending the path computation request, the end-to-end path,
    wherein the end-to-end path traverses the one or more L1 links that are traversed by the LSP.

16. The non-transitory computer-readable medium of claim 15, wherein the path computation request indicates that the path is to traverse at least one FR cluster of the IS-IS FR network.

17. A head Level 2 (L2) node of an intermediate system-intermediate system (IS-IS) flood reflection (FR) network, comprising:
  one or more memories; and
  one or more processors to:
    determine an end-to-end path from the head L2 node to a tail L2 node of the of the IS-IS FR network,
      wherein the IS-IS FR network includes a plurality of FR clusters; and
    send information associated with the end-to-end path to another node identified in the end-to-end path to cause a label switched path (LSP) to be established from the head L2 node to the tail L2 node,
      wherein the LSP traverses one or more FR clusters of the IS-IS FR network.

18. The head L2 node of claim 17, wherein sending the information associated with the end-to-end path to the other node allows a node of an FR cluster of the one or more FR clusters, to:
  determine a Level 1 (L1) path that traverses the FR cluster; and
  modify the information associated with the end-to-end path to indicate the L1 path to facilitate establishment of the LSP from the head L2 node to the tail L2 node.

19. The head L2 node of claim 17, wherein the one or more processors, to determine the end-to-end path, are to:
  send, to a path computation node associated with the IS-IS FR network, a path computation request for a path from the head L2 node to the tail L2 node; and
  receive, based on sending the path computation request, the end-to-end path from the path computation node,
    wherein the end-to-end path traverses the one or more FR clusters of the IS-IS FR network.

20. The head L2 node of claim 19, wherein the path computation request indicates that at least one:
  the path is to traverse at least one FR cluster of the one or more FR clusters of the IS-IS FR network, or
  the path is to not traverse at least one other FR cluster of the IS-IS FR network.

* * * * *